(12) United States Patent
Sato et al.

(10) Patent No.: US 11,237,064 B2
(45) Date of Patent: Feb. 1, 2022

(54) TEMPERATURE SENSOR

(71) Applicant: DENSO CORPORATION, Kariya (JP)

(72) Inventors: Motoki Sato, Kariya (JP); Takahiro Ogura, Kariya (JP)

(73) Assignee: DENSO CORPORATION, Kariya (JP)

( * ) Notice: Subject to any disclaimer, the term of this patent is extended or adjusted under 35 U.S.C. 154(b) by 4 days.

(21) Appl. No.: 16/944,401

(22) Filed: Jul. 31, 2020

(65) Prior Publication Data
US 2020/0363270 A1 Nov. 19, 2020

Related U.S. Application Data
(63) Continuation of application No. PCT/JP2019/002625, filed on Jan. 28, 2019.

(30) Foreign Application Priority Data
Jan. 31, 2018 (JP) .............................. JP2018-015626

(51) Int. Cl.
| | | |
|---|---|---|
| G01K 7/00 | (2006.01) | |
| G01K 1/00 | (2006.01) | |
| G01K 13/00 | (2021.01) | |
| G01K 7/02 | (2021.01) | |
| G01K 1/12 | (2006.01) | |
| G01K 13/02 | (2021.01) | |
| G01K 13/024 | (2021.01) | |

(52) U.S. Cl.
CPC ................. G01K 7/02 (2013.01); G01K 1/12 (2013.01); G01K 13/02 (2013.01); G01K 13/024 (2021.01); G01K 2205/02 (2013.01); G01K 2205/04 (2013.01)

(58) Field of Classification Search
USPC .......................... 374/179, 208, 163, 141, 144
See application file for complete search history.

(56) References Cited

U.S. PATENT DOCUMENTS

| | | | |
|---|---|---|---|
| 5,743,646 A | * | 4/1998 | O'Connell ............... G01K 1/08 374/148 |
| 2007/0258506 A1 | | 11/2007 | Schwagerman et al. |
| 2015/0377712 A1 | | 12/2015 | Nakanishi et al. |
| 2016/0033337 A1 | * | 2/2016 | Sato ......................... G01K 1/08 374/185 |
| 2016/0202128 A1 | * | 7/2016 | Kato ........................ G01K 1/10 374/208 |
| 2018/0073936 A1 | | 3/2018 | Ozeki et al. |

FOREIGN PATENT DOCUMENTS

| | | |
|---|---|---|
| JP | 6-229837 | 8/1994 |
| JP | H09-159542 | 6/1997 |
| JP | 2016-217909 | 12/2016 |
| TW | 201043586 | 12/2010 |

* cited by examiner

*Primary Examiner* — Mirellys Jagan
(74) *Attorney, Agent, or Firm* — Nixon & Vanderhye P.C.

(57) ABSTRACT

A temperature sensor includes a pair of thermocouple wires, a temperature measuring junction formed by joining tip ends of the pair of thermocouple wires together, an outer tube having a tip end provided with a tip end cover in which the temperature measuring junction is held, an insulator insulating the pair of thermocouple wires from the outer tube, and a glass seal filled in a base end of the outer tube to seal the outer tube from inside thereof. The glass seal contains bubbles which are independent of each other.

8 Claims, 18 Drawing Sheets

TEMPERATURE SENSOR

CROSS-REFERENCE TO RELATED APPLICATION

The present application is a continuation application of International Application No. PCT/JP2019/002625 filed on Jan. 28, 2019, which is based on and claims the benefit of priority from Japanese Patent Application No. 2018-015626 filed Jan. 31, 2018. The contents of these applications are incorporated herein by reference in their entirety.

BACKGROUND

The present disclosure relates to a temperature sensor.

Temperature sensors including a pair of thermocouple wires are used for measuring the temperature of exhaust gas, for example, flowing through the exhaust pipe of a vehicle. Such a pair of thermocouple wires are fixed to the interior of an outer tube in a state of being insulated by an insulator such as of magnesium oxide or aluminum oxide. The outer tube has a tip end closed by a metallic material and has a base end closed by a seal such as of glass or a resin. By isolating the interior of the outer tube from the outside, the pair of thermocouple wires are prevented from being oxidized and the insulator is prevented from absorbing moisture.

SUMMARY

An aspect of the present disclosure resides in a temperature sensor including:
- a pair of thermocouple wires;
- a temperature measuring junction;
- an outer tube;
- an insulator made of an insulating material; and
- a glass seal made of a glass material, wherein
the glass seal contains bubbles which are independent of each other.

It should be noted that the bracketed reference signs designated to the components in the aspect of the present disclosure indicate correspondency with the reference signs in the drawings referred to in the embodiment, and do not limit the components only to the content of the embodiment.

BRIEF DESCRIPTION OF THE DRAWINGS

The aims, characteristics or advantages of the present disclosure will be clarified more in the following description specifically explained referring to the accompanying drawings. Drawings of the present disclosure are as follows.

DETAILED DESCRIPTION OF THE PREFERRED EMBODIMENTS

Figure 1:
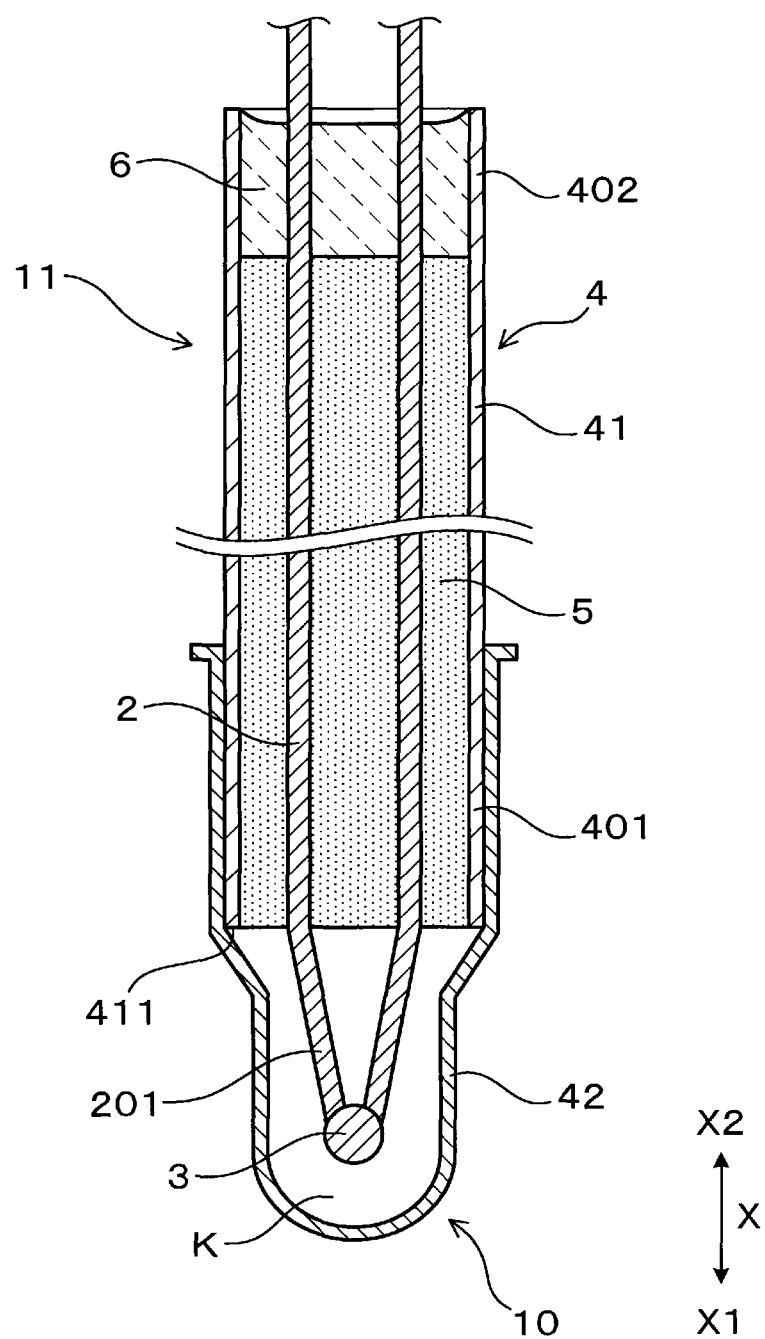
FIG. 1 is a cross-sectional view illustrating a main part of a temperature sensor according to an embodiment.

The inventor of the present disclosure has studied a temperature sensor which can suppress the inhibition of the state of an outer tube being sealed from inside thereof by a glass seal in the occurrence of cracks.

For example, JP H09-159542 A discloses a temperature sensor in which the outer tube (metal sheath) is sealed by using a sealant-impregnated layer as an insulator, instead of using a glass seal. The sealant-impregnated layer is obtained by impregnating a resin adhesive in the gaps of insulating powder particles.

When sealing an outer tube from inside thereof by using a glass seal, the gap between the inner periphery of the outer tube and the pair of thermocouple wires therein is entirely filled with the glass seal. In this case, the glass seal is heated and melted, and then cooled and solidified. While a temperature sensor is used, the temperature measuring tip end of the temperature sensor is heated by the measurement target gas and then cooled. These heating and cooling are iterated at the temperature measuring tip end of the temperature sensor.

When the temperature measuring tip end of a temperature sensor is heated or cooled, a thermal stress is applied to the glass seal. This is because the coefficient of linear expansion of the outer tube and the pair of thermocouple wires, which are made of respective metallic materials, is different from that of the glass seal made of a glass material. Specifically, when the temperature measuring tip end of a temperature sensor is heated, the outer tube and the pair of thermocouple wires expand more than the glass seal. When the temperature measuring tip end of the temperature sensor is cooled, the outer tube and the pair of thermocouple wires contract more than the glass seal.

Thus, the thermal stress, in particular, acting on the glass seal from the thermocouple wires may produce micro cracks in the glass seal. In addition, in the process of producing the temperature sensor, cracks may also be produced in the glass seal due to the stress applied thereto when the base ends of the thermocouple wires are processed following glass-sealing of the outer tube. These cracks do not raise any problem while they are very small. However, if the micro cracks extend across the glass seal, the state of the outer tube being sealed from inside thereof is not necessarily maintained by the glass seal.

In the temperature sensor disclosed in JP H09-159542 A, cracking may occur in the sealant-impregnated layer because the coefficient of linear expansion of the outer tube and the pair of thermocouple wires is different from that of the sealant-impregnated layer. Thus, when the cracks that have occurred in the sealant-impregnated layer extend therethrough, the state of the outer tube being sealed from inside thereof is not necessarily maintained by the sealant-impregnated layer.

The present disclosure has been made to provide a temperature sensor which can suppress the inhibition of the state of an outer tube being sealed from inside thereof by a glass seal in the occurrence of cracks.

An aspect of the present disclosure resides in a temperature sensor including:

a pair of thermocouple wires made of respective metallic materials different from each other;

a temperature measuring junction formed by joining tip ends of the pair of thermocouple wires together;

an outer tube made of a metallic material and having a tip end and a base end, the tip end holding the temperature measuring junction therein or having a tip end cover mounted thereto in which the temperature measuring junction is held, the base end allowing the pair of thermocouple wires to protrude therefrom;

an insulator made of an insulating material and disposed in the outer tube to insulate the pair of thermocouple wires from the outer tube and fix the pair of thermocouple wires to the outer tube; and a glass seal made of a glass material and filled in at least either of the base end of the outer tube and a holder mounted to the base end of the outer tube to seal the outer tube, wherein the glass seal contains bubbles which are independent of each other.

The glass seal of the temperature sensor of the above aspect contains bubbles which are independent of each other. These independent bubbles can protect the glass seal from cracks. Specifically, if cracks occur in the glass seal due to the thermal stress applied when the temperature sensor in use is heated or cooled, the bubbles can prevent the cracks from extending across the glass seal.

More specifically, if cracks occur in the glass seal and are likely to extend therein, the cracks may reach some of the bubbles. In this case, the bubbles, which are independently present in the glass seal, can prevent extension of the cracks. Thus, in the occurrence of cracks in the glass seal, these cracks are prevented from extending across the glass seal.

Thus, according to the temperature sensor of the above aspect, the state of the outer tube being sealed from inside thereof by the glass seal can be maintained in the occurrence of cracks.

Referring to the drawings, preferred embodiments of the temperature sensor set forth above will be described.

EMBODIMENTS

Figure 2:
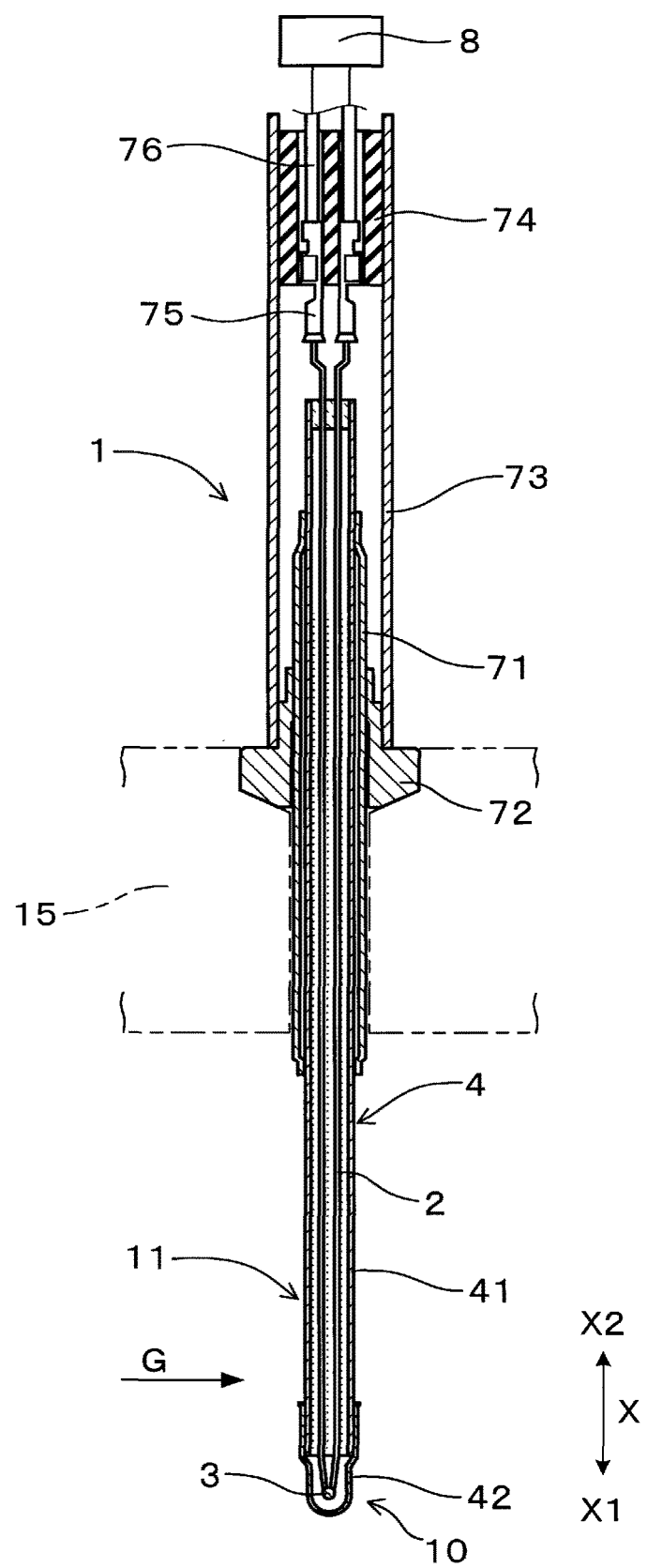
FIG. 2 is a cross-sectional view illustrating a temperature sensor according to an embodiment.

FIGS. 1 and 2 show a temperature sensor 1 of the present embodiment including a pair of thermocouple wires 2, a temperature measuring junction 3, an outer tube 4, a tip end cover 42, an insulator 5, and a glass seal 6. The pair of thermocouple wires 2 are made of respective metallic materials different from each other. The temperature measuring junction 3 is formed by joining the tip ends of the pair of thermocouple wires 2 together. The outer tube 4, which is made of a metallic material, has a tip end 401 to which the tip end cover 42 is mounted to hold the temperature measuring junction 3 therein, and a base end 402 allowing the pair of thermocouple wires 2 to protrude therefrom. The tip end cover 42 is mounted to a tip end outer periphery of the outer tube 4 and closes the outer tube 4 on a tip end side X1.

Figure 3:
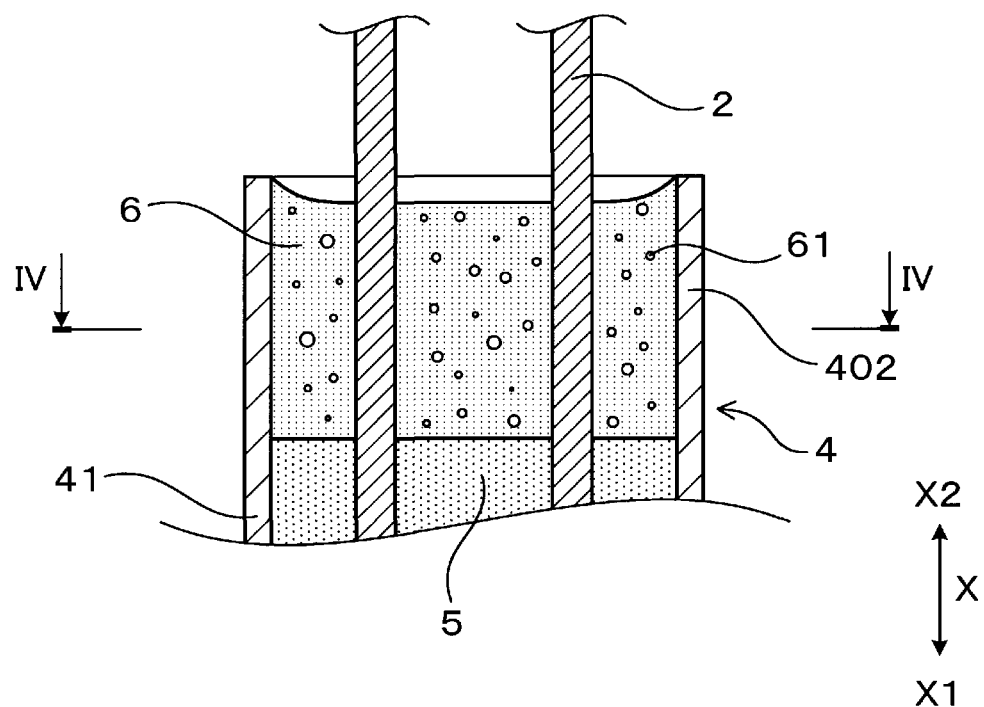
FIG. 3 is a cross-sectional view illustrating a portion near a base end of an outer tube, according to an embodiment.

The insulator 5, which is made of an insulating material, is disposed inside the outer tube 4 to insulate the pair of thermocouple wires 2 from the outer tube 4 and fix the pair of thermocouple wires 2 to the outer tube 4. The glass seal 6, which is made of a glass material, is filled in the base end 402 of the outer tube 4 to seal the outer tube 4 from inside thereof. As shown in FIG. 3, the glass seal 6 contains bubbles 61 independent of each other. It should be noted that the bubbles 61 of FIG. 3 are illustrated only schematically for the sake of clarity and thus are not to scale.

As shown in FIGS. 1 and 2, the tip end side X1 of the temperature sensor 1 of the present embodiment refers to a side where the temperature measuring junction 3 is provided in the outer tube 4 in an axial direction X along the center axis of the outer tube 4. The base end side X2 refers to an opposite side of the tip end side X1 in the axial direction X.

The temperature sensor 1 of the present embodiment will be described below.

(Temperature Sensor 1)

FIG. 2 shows a temperature sensor 1 for use in vehicles to measure the temperature of a fluid flowing through an intake pipe or an exhaust pipe of an internal combustion engine of the vehicle. The temperature sensor 1 of the present embodiment is disposed in an exhaust pipe 15 and used for measuring the temperature of exhaust gas, as a measurement target gas G under a measurement environment flowing through the exhaust pipe 15. The temperature of the exhaust gas is used by a control unit (electronic control unit) 8 when controlling the combustion of the internal combustion engine. For example, the temperature of the exhaust gas can be used for detecting the temperature of an exhaust purification catalyst disposed in the exhaust pipe. For example, the temperature sensor 1 can be disposed in an intake pipe of an exhaust recirculation passage in which the exhaust gas in the exhaust pipe is recirculated to the intake pipe.

Figure 13:
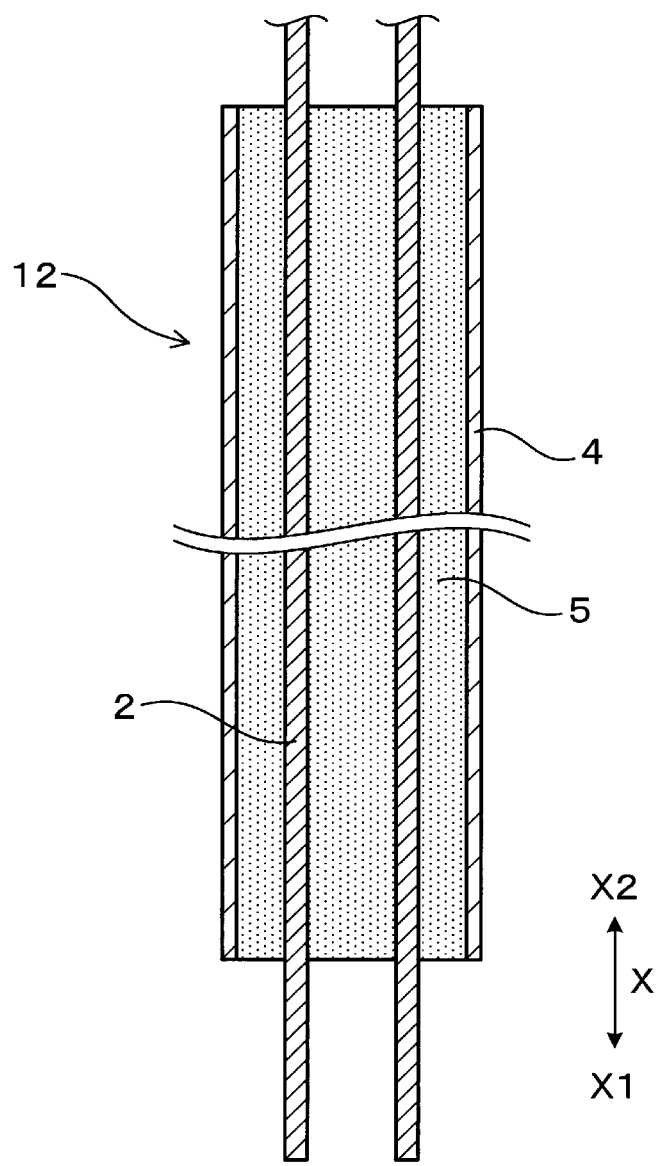
FIG. 13 is a diagram illustrating a sheathed pin used in a process of preparing a sheathed thermocouple, according to an embodiment.

As shown in FIG. 13, the pair of thermocouple wires 2, the outer tube 4 and the insulator 5 used of the present embodiment are integrally formed as a sheathed pin 12. As shown in FIG. 1, the temperature sensor 1 has a main part which is formed as a sheathed thermocouple 11 including the pair of thermocouple wires 2, the temperature measuring junction 3, the outer tube 4, the insulator 5 and the glass seal 6.

As shown in FIG. 2, the temperature sensor 1 also includes a first housing 71 and a second housing 72, which both hold the sheathed thermocouple 11 on the inside, a base end-side cover 73 mounted to the second housing 72, and a bush 74 held inside the base end-side cover 73. The first housing 71 is mounted to the outer periphery of the outer tube 4, while the second housing 72 is mounted to the outer periphery of the first housing 71. The second housing 72 is mounted to a mounting hole provided to an exhaust pipe 15. The bush 74 holds a terminal bracket 75 connected to the pair of thermocouple wires 2.

(Outer Tube 4)

Figure 5:
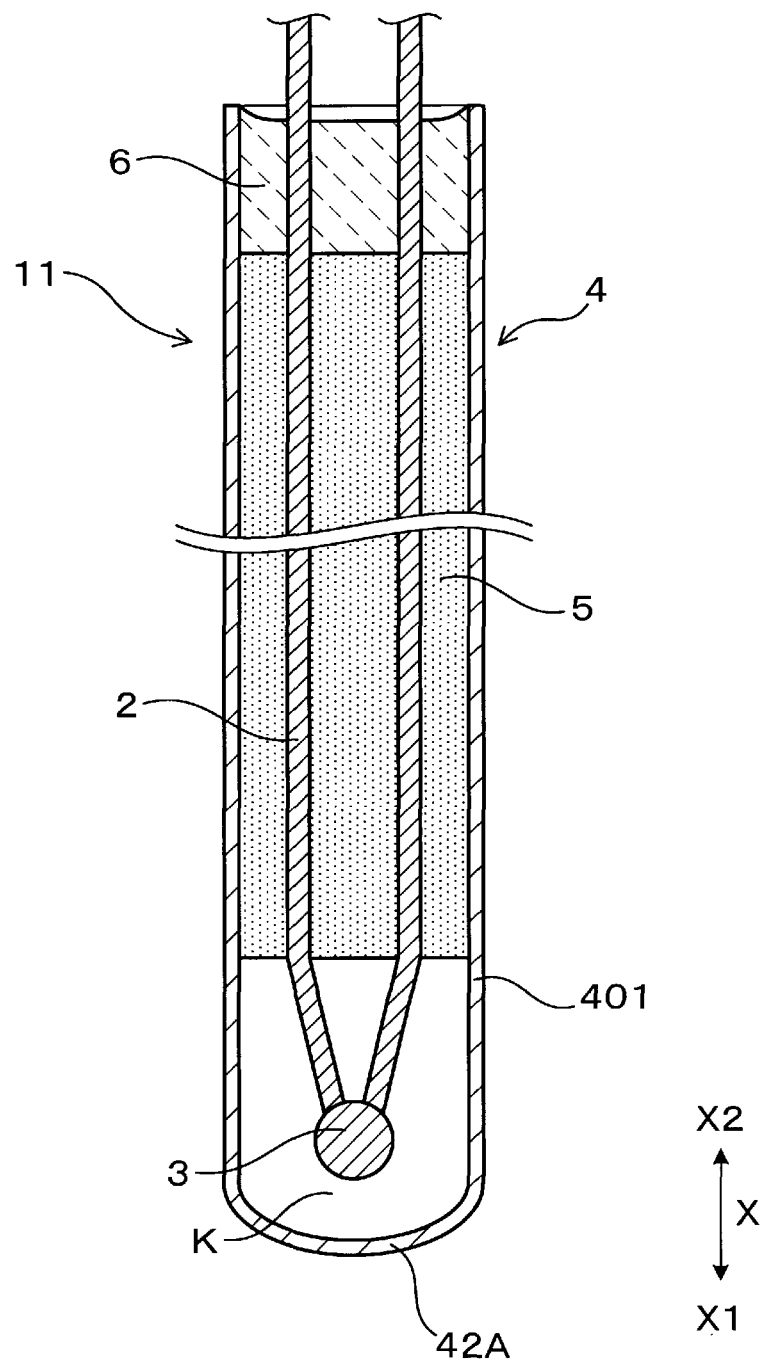
FIG. 5 is a cross-sectional view illustrating a main part of another temperature sensor according to an embodiment.
Figure 12:
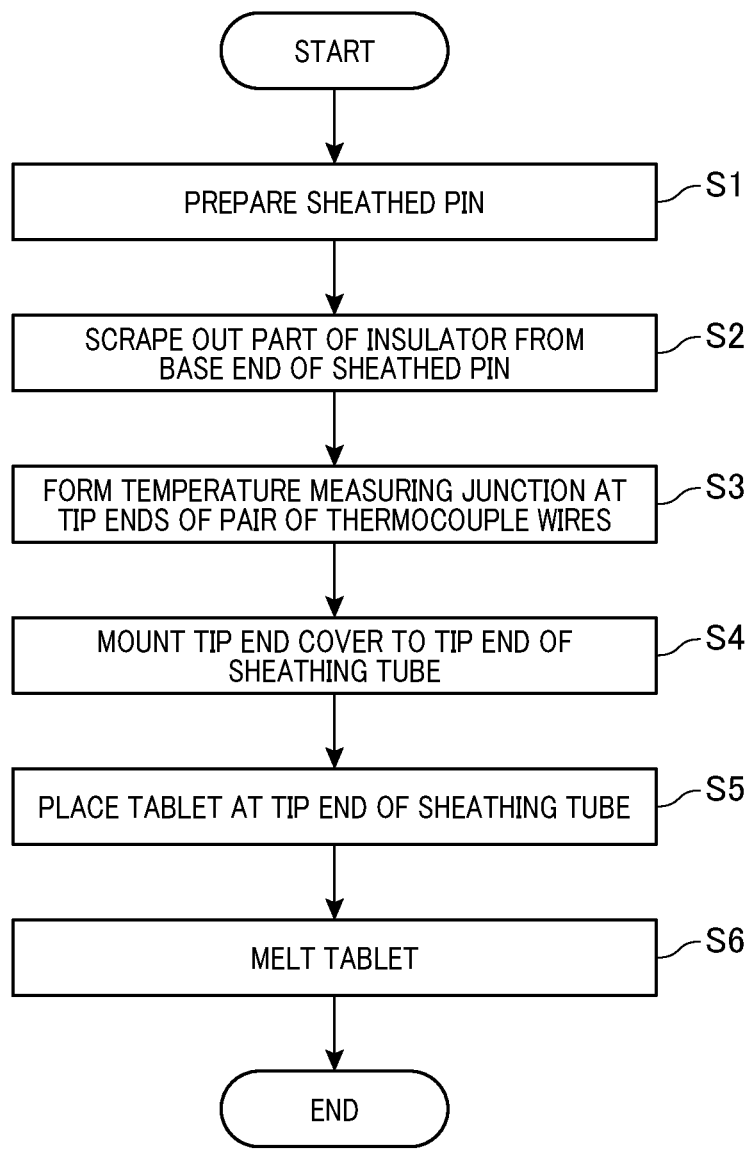
FIG. 12 is a flowchart illustrating a method of preparing a sheathed thermocouple forming a temperature sensor according to an embodiment.

The outer tube 4, which is also referred to as a sheathing tube or a metal sheath, is made of a metallic material, such as stainless steel (SUS or NCA) or an ultra heat-resistant alloy (NCF). As shown in FIG. 12, the outer tube 4 makes use of the outer tube of the sheathed pin 12 having a cylindrical shape. The tip end 401 of the outer tube 4 is closed by a metallic material. As shown in FIG. 1, the tip end 401, i.e., the tip end of a cylindrical part 41 of the outer tube 4, of the present embodiment is closed by the tip end cover 42 mounted to the outer periphery of the tip end 401. As shown in FIG. 5, the tip end 401 of the outer tube 4 may be closed by a cover 42A which is continuously formed from the tip end 401 of the cylindrical part 41. The cover 42A may be formed of a piece of metal welded to the tip end of the cylindrical part 41 of the outer tube 4.

The outer tube 4 of the present embodiment has an inner diameter in the range of $\phi 1.0$ mm to $\phi 10.0$ mm. The inner diameter of the outer tube 4 in this inner diameter range is suitable for easily forming independent bubbles 61 in the glass seal 6. If the inner diameter of the outer tube 4 is smaller than $\phi 1.0$ mm, compression effect is not necessarily exerted from the base end 402 of the outer tube 4 toward the glass seal 6. The compression effect is exerted when the heated outer tube 4 and the glass seal 6 are cooled. Specifically, when the stress at the glass-transition temperature is taken to be zero, the compression effect is an effect of a compression stress acting on the glass seal 6 from the outer tube 4 under a temperature environment of less than the glass-transition temperature, and enhancing the sealing performance of the glass seal 6, due to the coefficient of linear expansion of the outer tube 4 being greater than that of the glass seal 6. If the inner diameter of the outer tube 4 is larger than $\phi 10.0$ mm, the size of the sheathed thermocouple 11 increases, by which the responsiveness, mountability and the like of the temperature sensor 1 may be adversely affected.

If the inner diameter of the outer tube 4 is smaller than $\phi 1.0$ mm, the strength of the outer tube 4 may be reduced and therefore, for example, the temperature sensor 1 may be deformed due to the vibration of the vehicle to which the temperature sensor 1 is mounted, or the insulation may be impaired due to the reduction in insulation distance between the thermocouple wires 2. However, if these issues are improved, the inner diameter of the outer tube 4 may be reduced to about $\phi 0.8$ mm.

Figure 6:
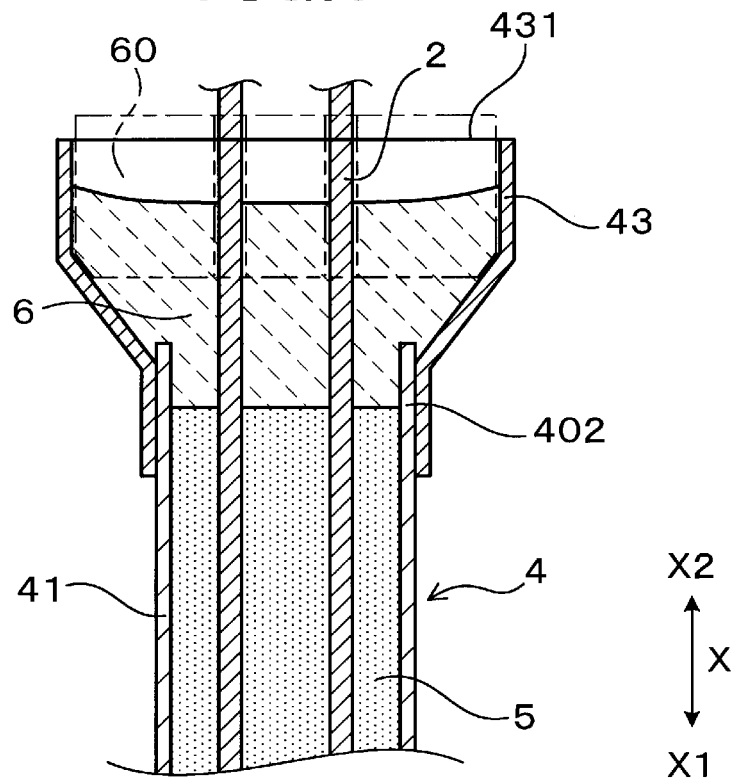
FIG. 6 is a cross-sectional view illustrating a portion near a base end of another outer tube, according to an embodiment.

As shown in FIG. 6, a holder 43 for placing a tablet 60 for the glass seal 6 may be mounted to the base end 402 of the outer tube 4. The holder 43 has a funnel shape and has an upper opening 431 with an inner diameter larger than the outer diameter of the outer tube 4. The holder 43 is used for filling a glass material, i.e., a melted tablet 60, in the base end 402 of the outer tube 4. The holder 43 may be press-fitted to the outer periphery of the base end 402 of the outer tube 4, or may be crimped and fixed to or welded to the outer periphery of the base end 402 of the outer tube 4.

The size of the tablet 60 placed in the holder 43 may be larger than the size thereof in the case of being placed in the base end 402 of the outer tube 4. When the tablet 60 placed in the holder 43 is melted as a glass material, the glass material can flow into the base end 402 of the outer tube 4 from inside the holder 43. Thus, a large amount of the glass material can be melted and the glass material can be sufficiently supplied to the base end 402 of the outer tube 4. Accordingly, the outer tube 4 can be more effectively sealed from inside thereof by the glass seal 6.

Figure 7:
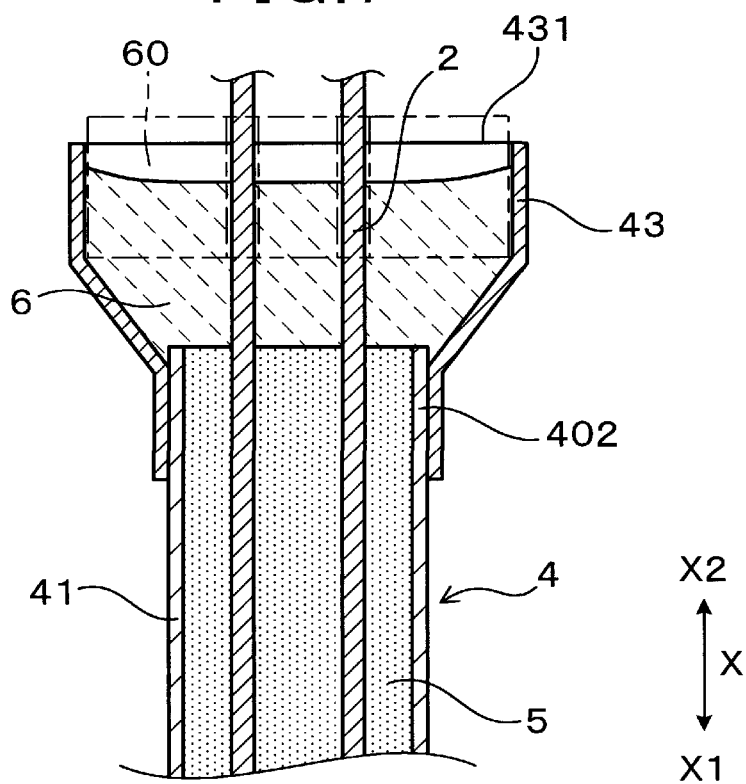
FIG. 7 is a cross-sectional view illustrating a portion near a base end of another outer tube, according to an embodiment.

As shown in FIG. 7, when the holder 43 is used, the glass seal 6 may be filled in the holder 43 to seal the base end 402 of the outer tube 4. In this case, the inner diameter of the holder 43 may be larger than that of the outer tube 4. By filling the holder 43 with the glass seal 6, a higher compression effect can be exerted and higher airtightness can be secured in the outer tube 4. Also, in this case, the time of scraping part of the insulator 5 from the base end of the sheathed pin 12 (the base end 402 of the sheathed tube 4) can be saved. It is more preferred that the glass seal 6 is filled in the holder 43 up to the level of the maximum diameter thereof. In this case, even higher compression effect can be exerted and even higher air tightness can be effectively secured in the outer tube 4.

(Pair of Thermocouple Wires 2)

The pair of thermocouple wires 2 are made of respective metallic materials different from each other so that the Seebeck effect can be exerted. The pair of thermocouple wires 2 of the preset embodiment form an N-type thermocouple (sheathed thermocouple 11). The temperature sensor 1 of the present embodiment can measure the temperature of a measurement target gas G having a temperature of 1,000° C. or more. The thermocouple wires 2 have a positive leg made of nicrosil which is an alloy comprising Ni (nickel), Cr (chromium) and Si (silicon) as main components. The thermocouple wires 2 have a negative leg made of nisil which is an alloy comprising Ni (nickel) and Si (silicon) as main components.

It should be noted that the pair of thermocouple wires 2 may form various types of thermocouples other than N type. For example, the pair of thermocouple wires 2 may form a K type thermocouple having a positive leg made of chromel which is an alloy comprising Ni and Cr as main components, and a negative leg made of alumel which is an alloy comprising Ni, Al and Si as main components.

As shown in FIG. 2, the pair of thermocouple wires 2 are inserted into the outer tube 4 so as to be parallel to each other. The pair of thermocouple wires 2 are drawn out from the outer tube 4 toward the base end side X2 and connected to an external control unit 8 via the terminal bracket 75 and leads 76 provided to the temperature sensor 1. The control unit 8 may be a sensor control unit (SCU) which is connected to an engine control unit (ECU). The control unit 8 may be formulated as an engine control unit.

(Temperature Measuring Junction 3)

As shown in FIG. 2, the temperature measuring junction 3, which is also referred to as a hot junction, is formed into a spherical shape by fusing the metallic material forming the positive leg of the pair of thermocouple wires 2 with the metallic material forming the negative leg thereof. The temperature sensor 1 has a temperature measuring tip end 10 which includes the temperature measuring junction 3 and the tip end cover 42 enclosing the temperature measuring junction 3. The pair of thermocouple wires 2 of the temperature sensor 1 are connected to an amplifier in the control unit 8 via the terminal bracket 75, the leads 76 and the like to form a circuit for measuring temperature. A reference junction located opposite to the temperature measuring junction 3 in the pair of thermocouple wires 2 is formed in the control unit 8. The temperature difference between the temperature measuring junction 3 and the reference junction generates an electromotive force in the pair of thermocouple wires 2.

Figure 8:
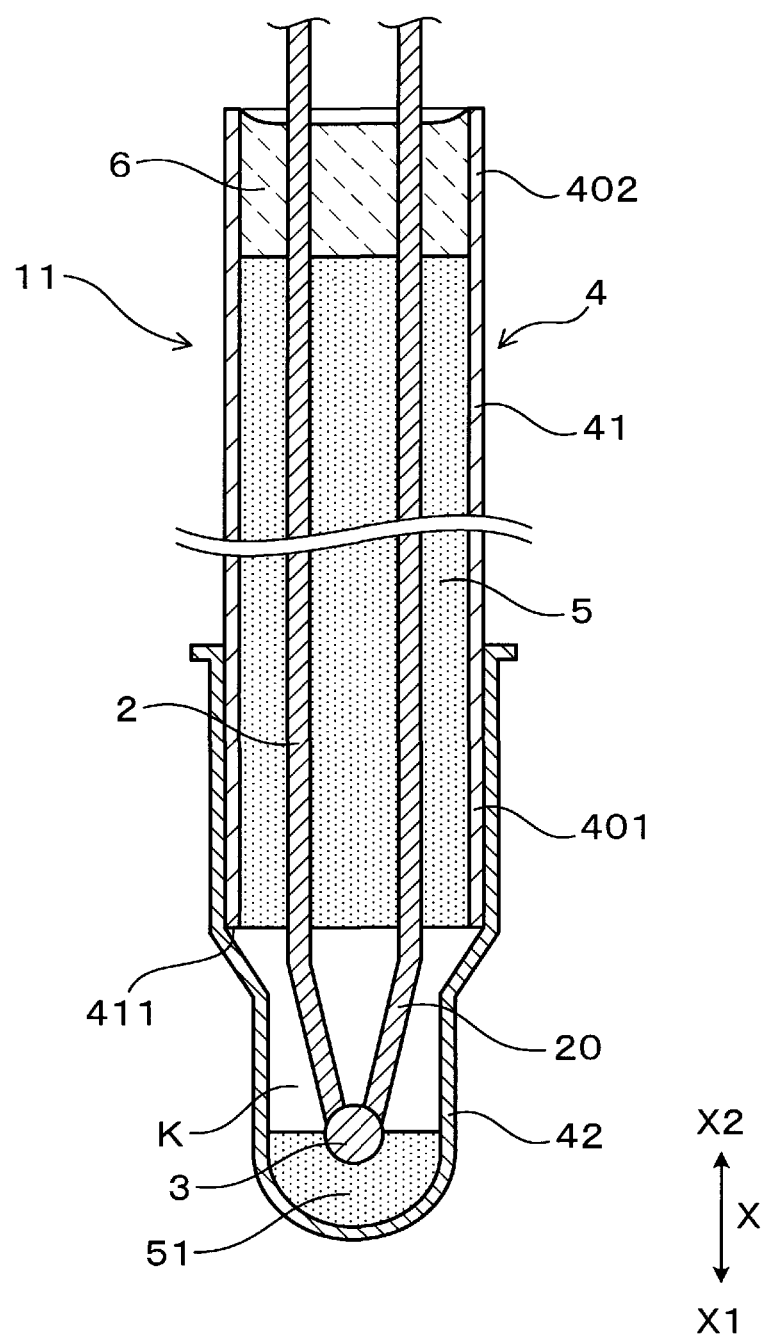
FIG. 8 is a cross-sectional view illustrating a main part of another temperature sensor according to an embodiment.

As shown in FIG. 1, the temperature measuring junction 3 of the present embodiment is disposed in a gas phase K in the tip end cover 42 which is mounted to the tip end 401 of the outer tube 4. As shown in FIG. 8, the temperature measuring junction 3 may be fixed to the tip end cover 42 via a filler 51 disposed inside the tip end cover 42. The filler 51 is made of an insulating metal oxide. Tip ends 201 of the pair of thermocouple wires 2 and the temperature measuring junction 3 are disposed so as to be protruded toward the tip end side X1 from a tip end opening 411 of the cylindrical part 41 of the outer tube 4.

(Insulator 5)

As shown in FIG. 1, the insulator 5 is made of a powder of a metal oxide, such as magnesium oxide (MgO) or aluminum oxide ($Al_2O_3$). The gap between the inner periphery of the outer tube 4 and the outer peripheries of the pair of thermocouple wires 2 is filled with a powder of the insulator 5. There are gaps formed between the powder particles of the insulator 5. The powder of the insulator 5 has been compressed when forming the sheathed pin 12 to reduce the diameter thereof. The pair of thermocouple wires 2 are held in the outer tube 4 by the powder of the insulator 5.

The filling ratio of the insulator 5 in the outer tube 4 is 60 vol % or more. The filling ratio of the insulator 5 refers to the ratio of the volume of the powder of the insulator 5 in the gap of the outer tube 4, excluding the pair of thermocouple wires 2, when the gap is taken to be 100 vol %.

If the filling ratio of the insulator 5 is less than 60 vol %, the melted glass seal 6 may permeate into the gaps between the powder particles of the insulator 5 when producing the temperature sensor 1. In this case, the sealing performance of the glass seal 6 may be impaired. Also, in this case, the process of producing the temperature sensor 1 may be required to be changed as will be described later, so that, for example, filling the outer tube 4 with the glass seal 6 is followed by filling the outer tube 4 with the insulator 5. A higher filling ratio can enhance the insulation between the pair of thermocouple wires 2 and the outer tube 4 accordingly, or enhance the holding performance of the outer tube 4 for the pair of thermocouple wires 2 accordingly. However, it is difficult to raise the filling ratio of the insulator 5 to a predetermined level or more due to manufacturing constraints. The filling ratio of the insulator 5 may be 90 vol % or less.

(Glass Seal 6)

The glass seal 6 is made of Bi-based glass comprising Bi (bismuth), or Pb-based glass comprising Pb (lead). The Bi-based glass comprises $Bi_2O_3$ (bismuth oxide) as a main component, other oxides and the like. Other oxides may include $B_2O_3$, SrO, ZnO and BaO. The Pb-based glass comprises PbO (lead oxide) as a main component, other oxides and the like. Other oxides may include $B_2O_3$, SrO, ZnO and $SiO_2$.

The content of Bi in the Bi-based glass may be in the range of 40 mass % to 80 mass %. If the content of Bi is less than 40 mass %, the melting temperature of melting the glass material, e.g., a tablet 60 described later, may increase and the thermocouple wires 2 may be oxidized and deteriorated. If the content of Bi exceeds 80 mass %, the melting temperature when melting the glass material may decrease and the glass seal 6 may be melted at the operating temperature of the temperature sensor 1.

The content of Pb in the Pb-based glass may be in the range of 50 mass % to 80 mass %. If the content of Pb is less than 50 mass %, the melting temperature when melting the glass material, e.g., tablet 60 described later, may increase and the thermocouple wires 2 may be oxidized and deteriorated. If the content of Pb exceeds 80 mass %, the melting temperature of the glass material may decrease and the glass seal 6 may be melted at the operating temperature of the temperature sensor 1.

Figure 9:
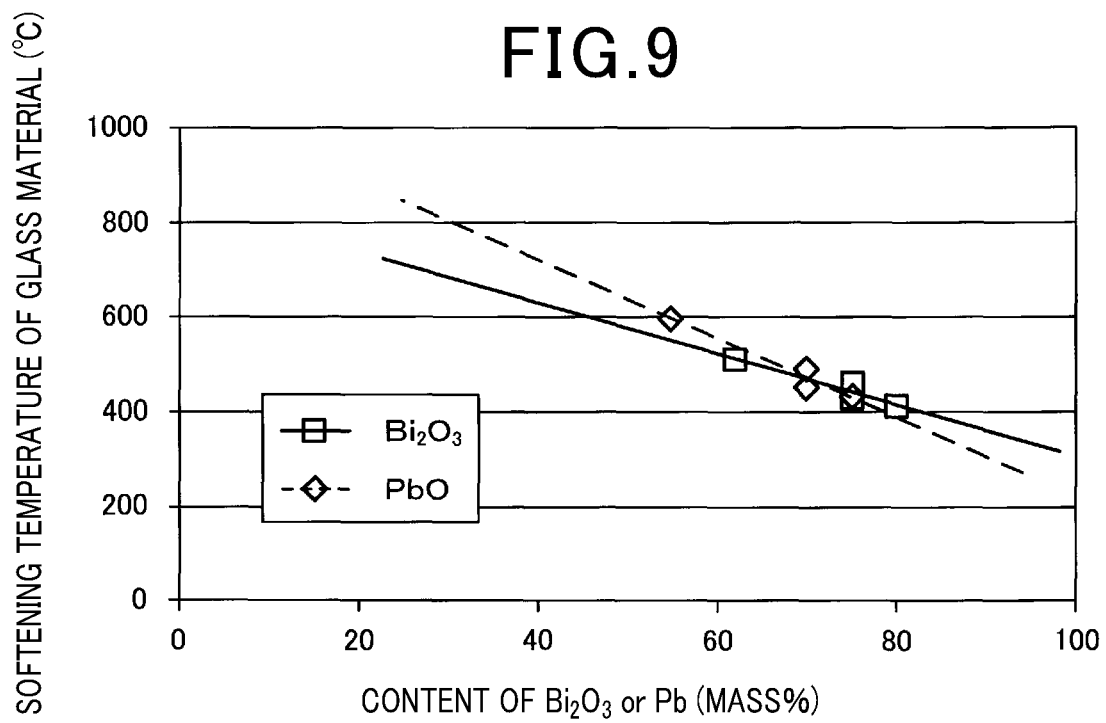
FIG. 9 is a graph illustrating a relationship between the content (mass %) of $Bi_2O_3$ or PbO in a tablet for a glass seal, and the softening temperature (° C.) of a glass material forming the tablet, according to an embodiment.

FIG. 9 shows a relationship between the content (mass %) of $Bi_2O_3$ or PbO in a tablet 60 for the glass seal 6, and the softening temperature (° C.) of the glass material forming the tablet 60. It will be understood that as the content of $Bi_2O_3$ or PbO increases, the softening temperature of the glass material decreases. When the Bi- or Pb-based glass is used, the tablet 60 can be melted by heating it, for example, to 400° C. to 700° C.

Figure 10:
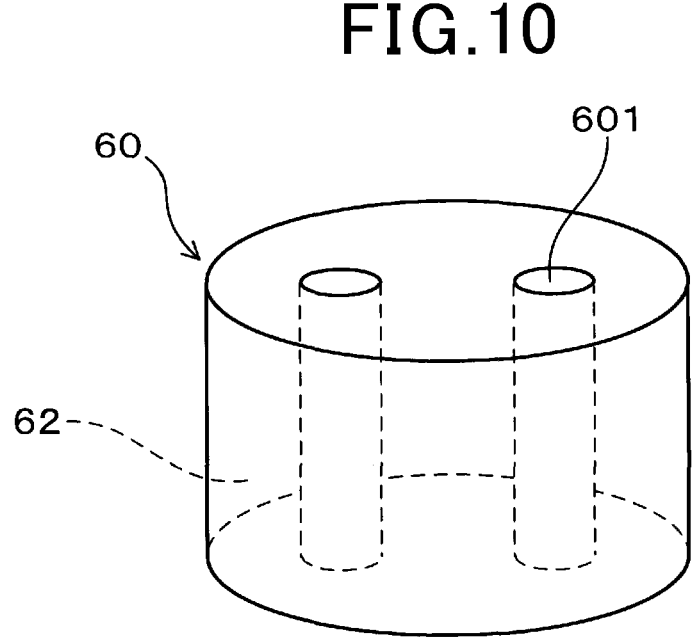
FIG. 10 is a perspective view illustrating a tablet for a glass seal, according to an embodiment.

The glass seal 6 is obtained by melting a solid-state glass tablet 60 and then solidifying the melted tablet 60. As shown in FIG. 10, the tablet 60 has a size suitable for insertion into the base end 402 of the outer tube 4 or the holder 43. The tablet 60 has two insertion holes 601 through which the pair of thermocouple wires 2 can be respectively inserted.

Figure 16:
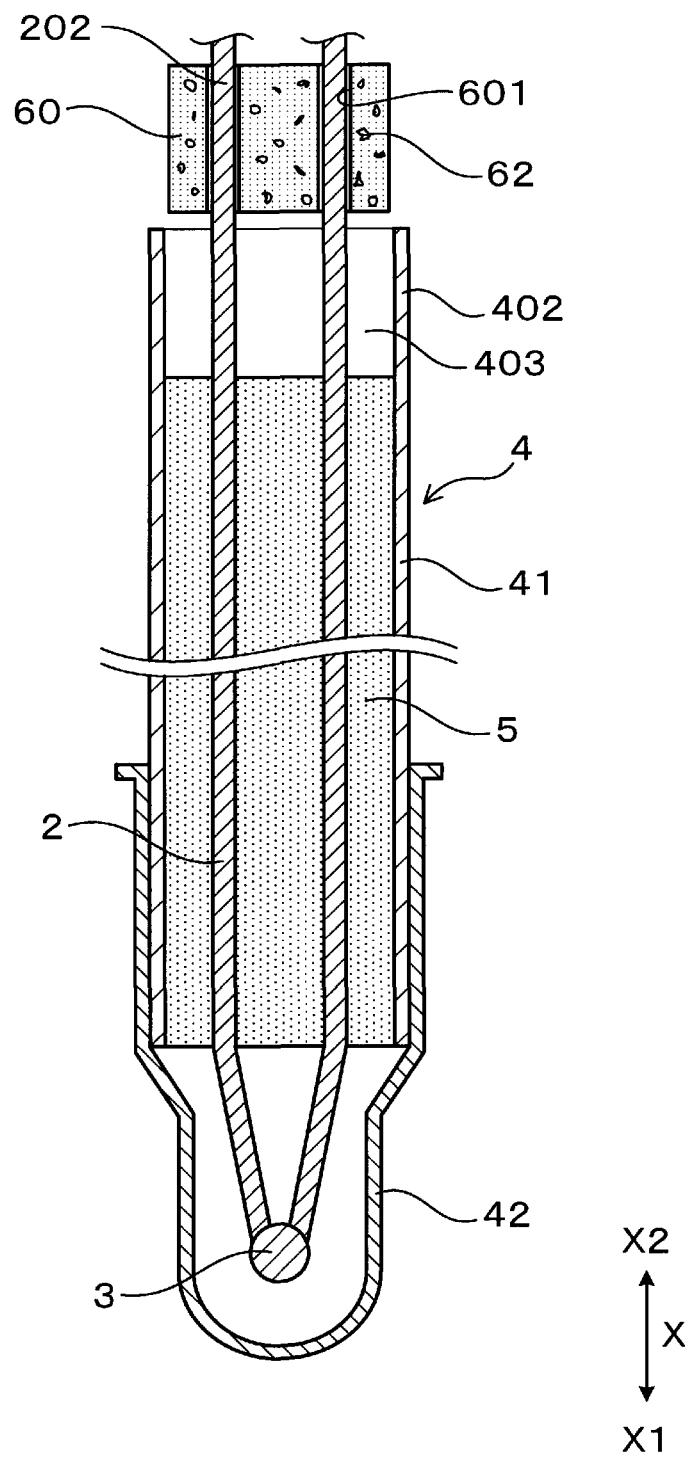
FIG. 16 is a diagram illustrating a state in which a tip end cover has been mounted to the tip end of an outer tube and a tablet has been placed at the base end of the outer tube in a process of preparing a sheathed thermocouple, according to an embodiment.

The tablet 60 used has a plurality of (a number of) voids 62. The tablet 60 of the present embodiment is obtained by press-forming a plurality of (a number of) glass particles. When glass particles are press-formed, voids 62 are formed in the tablet 60 due to the presence of the gaps between the glass particles. The voids 62 have various shapes and sizes. FIG. 16 schematically shows voids 62 formed in a tablet 60.

Figure 4:
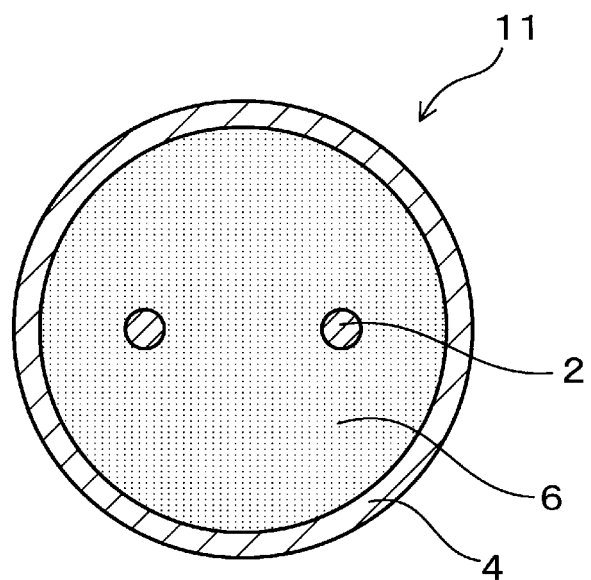
FIG. 4 is a cross-sectional view taken along the line Iv-Iv of FIG. 3.

As shown in FIG. 3, the glass seal 6 is formed by melting a tablet 60 having voids 62, and then deliberately allowing (a number of) bubbles 61 to remain in the melted tablet 60. FIG. 4 shows a cross section of the glass seal 6 including peripheral components in the sheathed thermocouple 11, perpendicular to the axial direction X. The independent bubbles 61 in the glass seal 6 may have various shapes, such as substantially a spherical shape, flattened spherical shape, collapsed spherical shape, prolate spherical shape or ellipsoidal shape. However, most of the bubbles 61 have a spherical shape due to surface tension. The term independent bubbles 61 refers to bubbles 61 which are independently present in the glass seal 6. These bubbles 61 are also referred to as closed voids.

The glass seal 6 may have ends where concavities are formed by some of the bubbles 61. some of the bubbles 61 in the glass seal 6 may be formed being connected to each other. However, the bubbles 61 in the glass seal 6 do not pass through the glass seal 6.

At least some of the bubbles 61 in the glass seal 6 has a size of 1 μm to 100 μm. The bubbles 61 in the glass seal 6 have various sizes, shapes and the like. The term size of the bubbles 61 may refer to the maximum diameter of the bubbles 61. The maximum diameter of the bubbles 61 may be the length of the longest straight line in the bubbles 61.

Most of the bubbles 61 of the present embodiment have a size in the range of 1 µm to 100 µm. It is preferred that the bubbles 61 having a size of 1 µm to 100 µm are the largest in number among the entire bubbles 61 contained in the glass seal 6.

The bubbles 61 in the glass seal 6 may include bubbles 61 smaller than 1 µm or bubbles 61 larger than 100 µm. However, the bubbles 61 smaller than 1 µm may be unlikely to prevent extension of cracks that may occur in the glass seal 6. The bubbles 61 larger than 100 µm may reduce the strength of the glass seal 6 or may impair the sealing performance of the glass seal 6. From the perspective of sealing performance, the upper size limit of the bubbles 61 may more preferably be 50 µm or less.

The bubbles 61 are dispersed in the entire glass seal 6. The bubbles 61 may be approximately entirely dispersed in the glass seal 6, or do not necessarily have to be homogeneously dispersed in the entire glass seal 6. The bubbles 61 are those which have remained in the tablet 60 for the glass seal 6, when melted, without being degassed (expelled). The bubbles 61 are the voids 62 in the tablet 60 or the gaps between the powder particles of the insulator 5, remained in the glass seal 6.

The bubble ratio, which is the ratio of the bubbles 61 in the glass seal 6, is in the range of 5 vol % to 30 vol %. The term bubble ratio refers to the ratio of the total volume of the bubbles 61 relative to the total volume of the glass seal 6. If the bubble ratio is less than 5 vol %, it means that the number of the bubbles 61 in the glass seal 6 is small and therefore the bubbles 61 are less likely to effectively prevent the extension of the cracks that may occur in the glass seal 6. If the bubble ratio exceeds 30 vol %, it means that the number of the bubbles 61 in the glass seal 6 is large and therefore, the strength of the glass seal 6 may be reduced or the sealing performance of the glass seal 6 may be impaired.

The size and bubble ratio of the bubbles 61 in the glass seal 6 can be determined by cross-sectionally slicing the glass seal 6 at an appropriate position and observing the cross section by a scanning electron microscope (SEM). To facilitate specification, the size of the bubbles 61 may be approximated by the maximum diameter of the bubbles 61 appearing in the cross section of the glass seal 6 (the longest straight line in the bubbles 61 in the cross section). The SEM observation of the glass seal 6 may be performed for a plurality of cross sections, and the size of the bubbles 61 may be determined based on the sizes of the bubbles 61 observed in the plurality of cross sections.

The bubble ratio can be calculated as a ratio of the total area of the bubbles 61 relative to the total area of the cross section of the glass seal 6. The ratio of the area may be an average of the values calculated for a plurality of cross sections.

The size of the bubbles 61 contained in the glass seal 6 may be controlled by controlling the porosity of the tablet 60 for the glass seal 6. The porosity of the tablet 60 may be expressed as a ratio of the total volume of the voids 62 relative to the total volume of the tablet 60. As the porosity of the tablet 60 is increased, the maximum bubble size among the bubbles 61 formed in the glass seal 6 can be increased.

Figure 11:
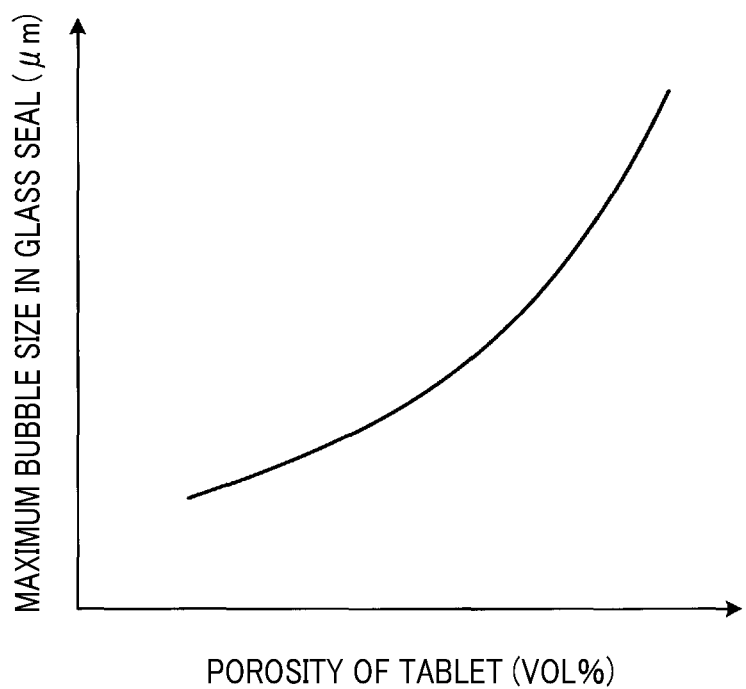
FIG. 11 is a graph illustrating a relationship between the porosity of a tablet, and the maximum bubble size in the glass seal, according to an embodiment.

FIG. 11 shows a relationship between the porosity (vol %) of a tablet 60, and the maximum bubble size (µm) in the glass seal 6. As the porosity of the tablet 60 is reduced, the size of the bubbles 61 formed in the glass seal 6 can be reduced. However, if the porosity of the tablet 60 is less than 10 vol %, the bubbles 61 with a target size of 1 µm to 100 µm are unlikely to be obtained. If the porosity of the tablet 60 exceeds 50 vol %, bubbles 61 having a size exceeding 100 µm are likely to be formed in the glass seal 6. Accordingly, the porosity of the tablet 60 may be set in the range of 10 vol % to 50 vol %.

(Coefficient of Linear Expansion)

The metallic material forming the outer tube 4 and the metallic materials forming the pair of thermocouple wires 2 have respective coefficients of linear expansion of about 10 to $15 \times 10^{-6}$ (1/K) at a temperature in the range of room temperature (25° C.) to about 300° C. The glass material forming the glass seal 6 has a coefficient of linear expansion of about 6 to $9 \times 10^{-6}$ (1/K) at a temperature in the range of room temperature (25° C.) to about 300° C. When the temperature sensor 1 is heated or cooled, the outer tube 4 and the pair of thermocouple wires 2 expand or contract more than the glass seal 6.

(Preparation Method)

Referring to the flowchart of FIG. 12, a method of preparing the sheathed thermocouple 11 as a main part of the temperature sensor 1 of the present embodiment will be described.

Figure 14:
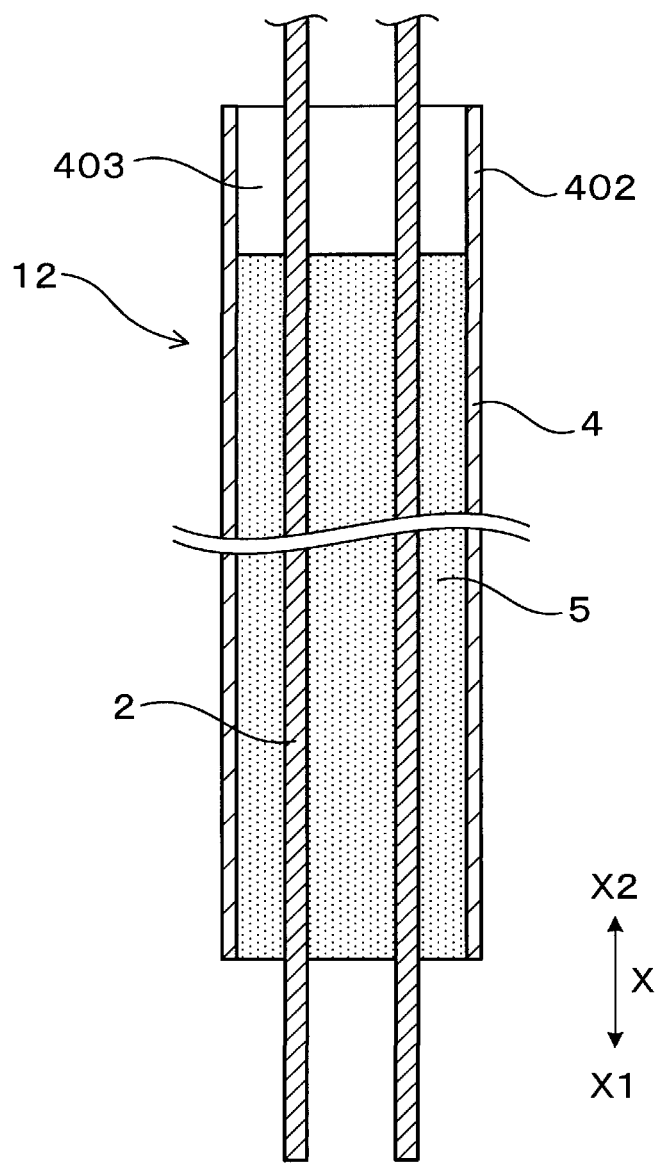
FIG. 14 is a diagram illustrating a state in which part of an insulator has been scraped from the base end of a sheathed pin in a process of preparing a sheathed thermocouple, according to an embodiment.

First, a sheathed pin 12 including an outer tube 4 in which a pair of thermocouple wires 2 are held by an insulator 5 is prepared (step S1 of FIG. 12). As shown in FIG. 13, the pair of thermocouple wires 2 are protruded from both the tip end side X1 and the base end side X2 of the sheathed pin 12. Then, as shown in FIG. 14, in a state in which the pair of thermocouple wires 2 and the outer tube 4 are sustained, part of the insulator 5 is scraped from the base end of the sheathed pin 12 (step S2). In this case, the insulator 5 can be scraped by shot blasting or the like. After scraping the insulator 5, a space 403 is left at the base end 402 of the outer tube 4.

Figure 15:
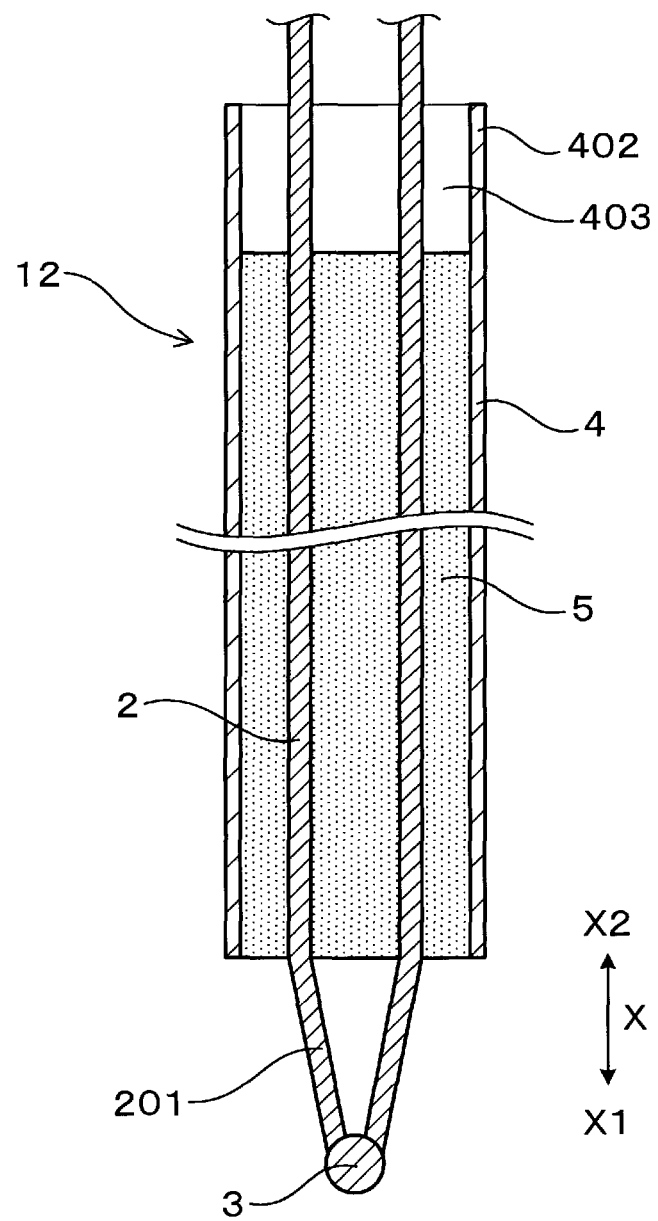
FIG. 15 is a diagram illustrating a state in which a temperature measuring junction has been formed at the tip ends of a pair of thermocouple wires in a process of preparing a sheathed thermocouple, according to an embodiment.

Then, as shown in FIG. 15, tip ends 201 of the pair of thermocouple wires 2 protruding from the tip end of the sheathed pin 12 are brought into contact with each other while being fused by using a laser or the like, so that the tip ends 201 are joined together to thereby form a temperature measuring junction 3 (step S3). Then, as shown in FIG. 16, a tip end cover 42 is mounted to the tip end 401 of the outer tube 4 of the sheathed pin 12, crimped and fixed to the tip end 401 of the outer tube 4 by welding or the like (step S4). In this case, a filler 51 that is a powdered metal oxide may be disposed inside the tip end cover 42 to fix the temperature measuring junction 3 to the tip end cover 42 (see FIG. 8). It should be noted that steps S3 and S4 may be performed prior to step S2.

Then, as shown in FIG. 16, a tablet 60 for forming the glass seal 6 is placed in the space 403 at the base end 402 of the outer tube 4 (step S5). In this case, the base ends 202 of the pair of thermocouple wires 2 protruding from the base end 402 of the outer tube 4 are respectively inserted into through holes 601 of the tablet 60. Then, the base end 402 of the outer tube 4 and the tablet 60 are heated to a temperature at which the tablet 60 is melted (step S6).

When the tablet 60 melts, the voids 62 in the tablet 60 are degassed in the form of bubbles 61 upward in the tablet 60. Also, the gaps in the insulator 5 may be degassed in the form of bubbles 61 upward in the tablet 60. The bubbles 61 can be permitted to remain in the glass seal 6 by controlling degassing.

For example, degassing may be controlled by controlling the temperature of heating the tablet 60 after being melted. As the temperature of heating the tablet 60 increases, the viscosity of the glass material of the melted tablet 60 decreases accordingly, and the bubbles 61 are easily degassed upward accordingly. As the temperature of heating the tablet 60 decreases, the viscosity of the glass material of the melted tablet 60 increases accordingly, and the bubbles 61 are less likely to be degassed upward. Whether the bubbles 61 remain in the melted glass material or are degassed to the outside of the glass material depends on the relationship between the viscosity of the glass material and the buoyance of the bubbles 61. As the tablet 60 has a higher porosity, the bubbles 61 are more likely to remain in the melted tablet 60.

It is considered that degassing can also be controlled by controlling the pressure in the environment of heating the tablet 60. Specifically, it is considered that, when the pressure in the heating environment is increased, degassing is less likely to occur, and when the pressure in the heating environment is decreased, for example, to near a vacuum state, degassing is more likely to occur.

When heating of the base end 402 of the outer tube 4 has been completed and the melted tablet 60 has been cooled and solidified, a glass seal 6 containing bubbles 61 is obtained. Thus, the base end 402 of the outer tube 4 is sealed by the glass seal 6, and the interior of the outer tube 4 is isolated from the outside by the glass seal 6. In this way, a sheathed thermocouple 11 as a main part of the temperature sensor 1 is prepared.

(Another Preparation Method)

Figure 17:
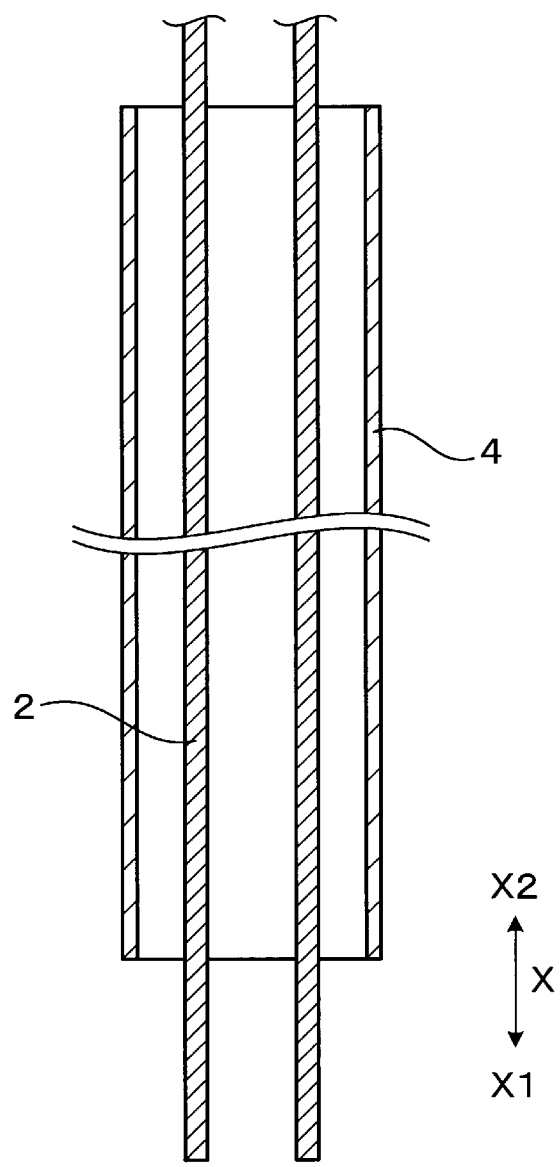
FIG. 17 is a diagram illustrating a state in which a pair of thermocouple wires have been inserted into an outer tube in a process of preparing another thermocouple, according to an embodiment.
Figure 18:
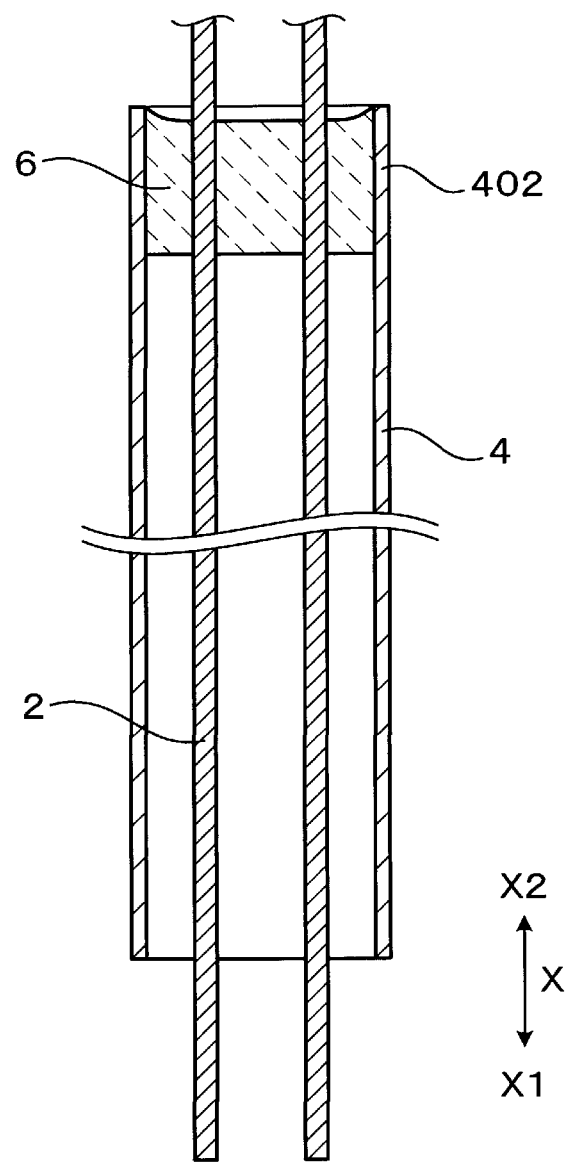
FIG. 18 is a diagram illustrating a state in which a glass seal has been filled in the base end of an outer tube in a process of preparing another thermocouple, according to an embodiment.
Figure 19:
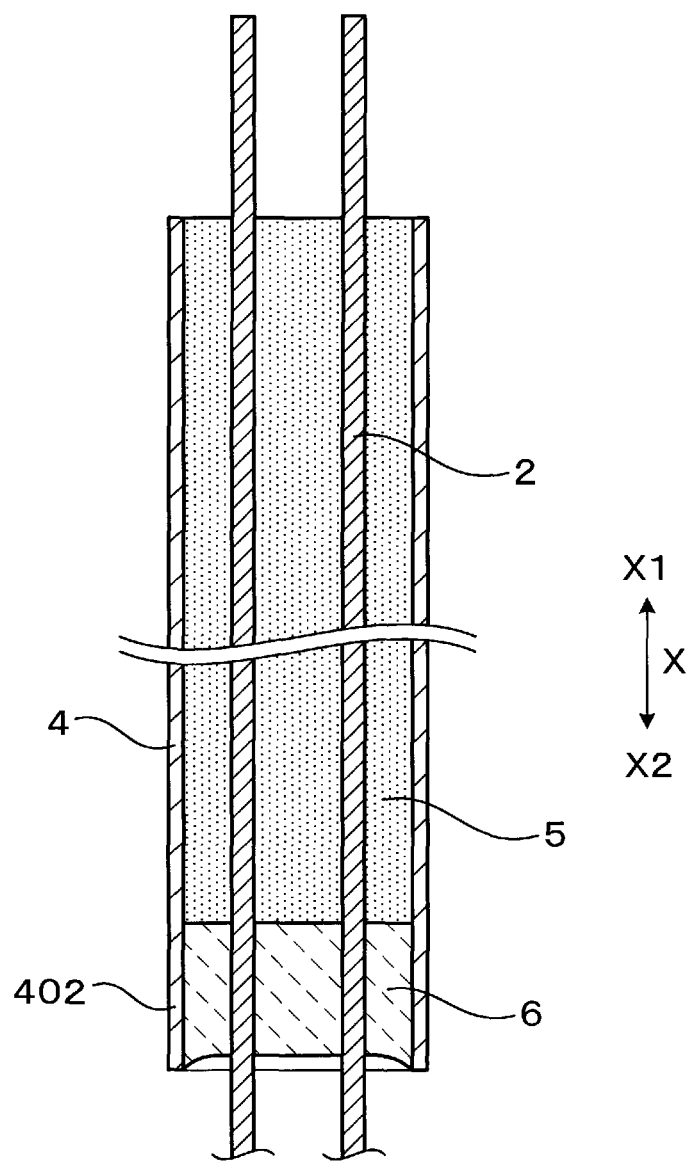
FIG. 19 is a diagram illustrating a state in which an insulator has been filled in an outer tube in a process of preparing another thermocouple, according to an embodiment.
Figure 20:
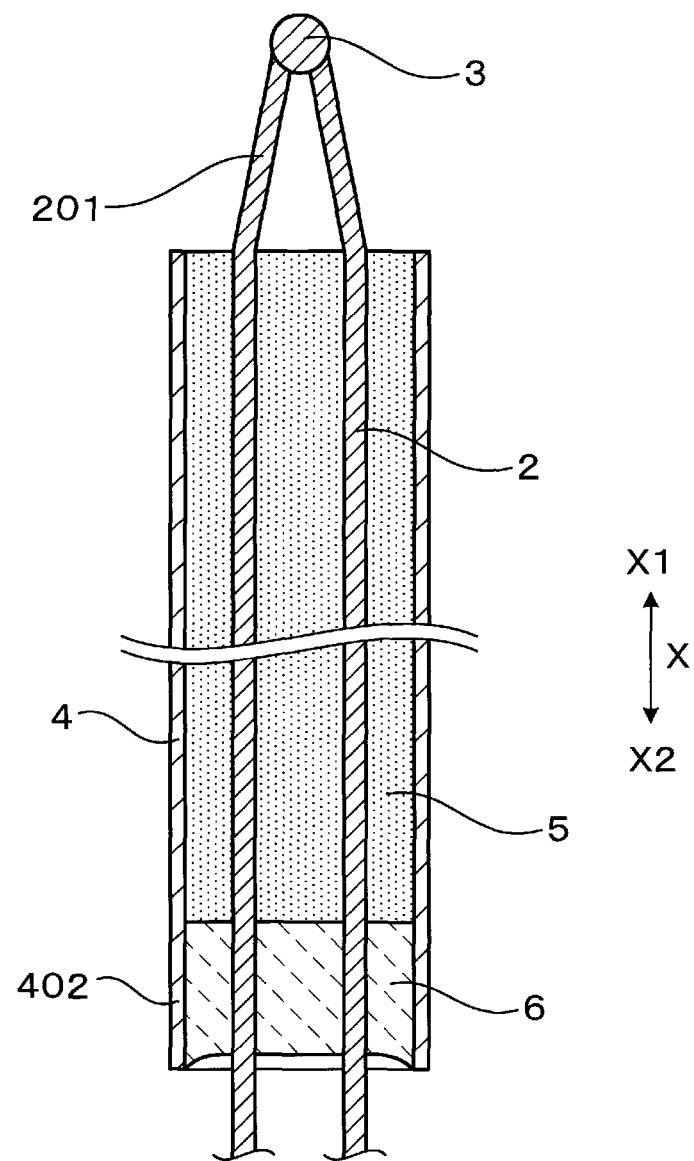
FIG. 20 is a diagram illustrating a state in which a temperature measuring junction has been formed at the tip ends of a pair of thermocouple wires in a process of preparing another thermocouple, according to an embodiment.

The thermocouple 11 can also be prepared as follows without using a sheathed pin 12. First, as shown in FIG. 17, a pair of thermocouple wires 2 are inserted into an outer tube 4 so as to be parallel to the inner periphery thereof. Then, as shown in FIG. 18, a glass seal 6 is filled in the base end 402 of the outer tube 4 using a tablet 60. In this case, bubbles 61 are formed in the glass seal 6 from the voids 62 contained in the tablet 60. Then, as shown in FIG. 19, the direction of the outer tube 4 is changed upside down so that the glass seal 6 is located at the bottom, and an insulator 5 is filled in the outer tube 4 from above the glass seal 6. In this case, the filling ratio of the insulator 5 is about 20 vol %. Then, as shown in FIG. 20, tip ends 201 of the pair of thermocouple wires 2 are fused together to form a temperature measuring junction 3. After that, a tip end cover 42 can be mounted to the tip end 401 of the outer tube 4 to thereby prepare a thermocouple 11.

Advantageous Effects

The glass seal 6 of the temperature sensor 1 according to the present embodiment contains bubbles 61 which are independent of each other. These independent bubbles 61 can protect the glass seal 6 from cracks.

Specifically, if the temperature of the measurement target gas G under a measurement environment is higher than the temperature such as of the temperature measuring tip end 10 or the outer tube 4 of the temperature sensor 1, the temperature measuring tip end 10 or the outer tube 4 is heated by the measurement target gas G. In this case, the pair of thermocouple wires 2 expand more than the glass seal 6. Therefore, the pair of thermocouple wires 2 push the glass seal 6. Thus, a thermal stress (tensile stress) may be applied to the glass seal 6, and microcracking may occur in the glass seal 6 around the thermocouple wires 2.

If the temperature of the measurement target gas G is lower than the temperature such as of the temperature measuring tip end 10 or the outer tube 4, the temperature measuring tip end 10 or the outer tube 4 is cooled by the measurement target gas G. In this case, the outer tube 4 and the pair of thermocouple wires 2 contract more than the glass seal 6. Therefore, the pair of thermocouple wires 2 separate from the glass seal 6. Thus, a thermal stress may be applied to the glass seal 6, and microcracking may occur in the glass seal 6 around the thermocouple wires 2.

Figure 21:
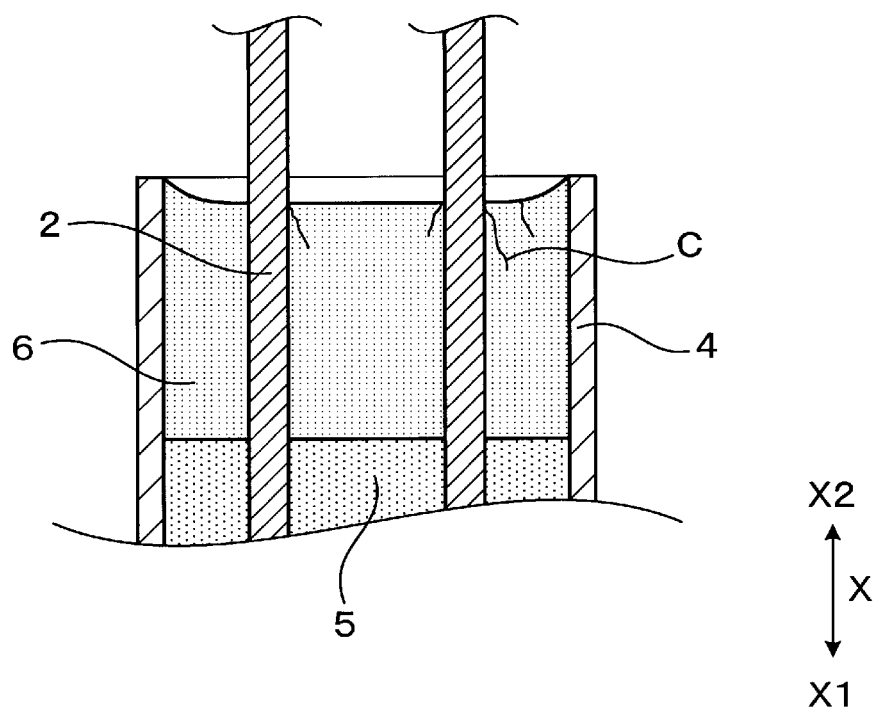
FIG. 21 is a diagram illustrating a state in which cracks have occurred in a glass seal, according to an embodiment.

As shown in FIG. 21, micro cracks C often occur on the surface of the glass seal 6 on the base end side X2, starting from portions around the pair of thermocouple wires 2. If no measures have been taken for the bubbles 61 to remain in the glass seal 6, the cracks C may extend from the surface of the glass seal 6 on the base end side X2 toward the tip end side X1 and may finally extend across the length of the glass seal 6 in the axial direction X.

Micro cracks C may also occur when the glass material of the melted tablet 60 solidifies in the process of preparing the sheathed thermocouple 11. Furthermore, micro cracks C may also occur due to the stress applied when the base ends 202 of the thermocouple wires 2 are processed after the glass-sealing in the process of preparing the sheathed thermocouple 11.

In the temperature sensor 1 of the present embodiment, the bubbles 61 contained in the glass seal 6 can prevent cracks C, if occurred in the glass seal 6, from extending across the glass seal 6 in the axial direction X. Specifically, if cracks C occur in the glass seal 6 and extend therein, the cracks C may reach some of the bubbles 61. In this case, since the bubbles 61 are independently present in the glass seal 6, extension of the cracks C is prevented by the bubbles 61. Thus, in the occurrence of cracks C in the glass seal 6, these cracks C are prevented from extending across the glass seal 6.

Thus, according to the temperature sensor 1 of the present embodiment, the state of the outer tube 4 being sealed from inside thereof by the glass seal 6 can be maintained in the occurrence of cracks C.

Example 1

The present example shows the sheathed thermocouple 11 of the temperature sensor 1 of the embodiment as an example. A test of examining airtightness was conducted for the sheathed thermocouple 11.

The pair of thermocouple wires 2 of the present example were configured by the N-type sheathed thermocouple 11. The outer tube 4 of the present example had an inner diameter of $\phi$1.8 mm and a thickness of 0.3 mm, and was made of a material of NCF601 (super stainless steel). The insulator 5 of the present example was made of MgO powder. The glass seal 6 of the present example had an outer diameter of $\phi$1.5 mm, a length of 1.5 mm and a porosity of 20 vol %, and was made of Pb-based glass (with a PbO content of 70 mass %).

When preparing the sheathed thermocouple 11 of the present example, the base end of the sheathed pin 12 was shot-blasted to a depth of about 5 mm from the base end of the outer tube 4 to remove part of the insulator 5. Then, a tablet 60 for forming the glass seal 6 was placed in the space 403 at the base end 402 of the outer tube 4, from which part of the insulator 5 had been removed. Then, the base end 402 of the outer tube 4 and the tablet 60 were heated to melt the tablet 60 and form a glass seal 6 containing bubbles 61, so that the base end 402 of the outer tube 4 was sealed with the glass seal 6.

In this case, the tablet 60 was continuously heated for 30 minutes and melted under conditions where the maximum temperature was 630° C. After that, heating was stopped to cool and solidify the tablet 60, thereby forming a glass seal 6 containing bubbles 61. It is recommended that the heating rate and the cooling rate for the tablet 60 both be 20° C./min.

Thus, bubbles 61 having a size of 1 µm to 20 µm were formed in the glass seal 6. In this way, a sheathed thermocouple 11 including a pair of thermocouple wires 2, an outer tube 4 and an insulator 5 was prepared for use in the temperature sensor 1. When the glass seal 6 of the prepared sheathed thermocouple 11 was observed, the presence of micro cracks C that had occurred during preparation was confirmed.

Then, the sheathed thermocouple 11 was tested in terms of airtightness. In this test, airtightness was examined at the initial stage of preparation, after continuously heating the sheathed thermocouple 11 to 400° C., and after iteration of heating and cooling of the sheathed thermocouple 11. To easily examine airtightness, the gas inside the outer tube 4 was replaced by helium (He) gas.

As a result, it was confirmed that airtightness was secured in the outer tube 4 by the glass seal 6. The reason why airtightness was secured is considered to be that the extension of the cracks C was prevented due to the glass seal 6 containing the bubbles 61.

In the present example, like reference signs shown in the embodiment designate like components of the embodiment 1.

Example 2

The present example also shows the sheathed thermocouple 11 of the temperature sensor 1 of the embodiment as an example. A test of examining airtightness was conducted for the sheathed thermocouple 11.

In the sheathed thermocouple 11 of the present example, a holder 43 was mounted to the outer periphery of the base end 402 of the outer tube 4. The pair of thermocouple wires 2 of the present example were configured by the N-type sheathed thermocouple 11. The outer tube 4 of the present example had an inner diameter of ϕ1.8 mm and a thickness of 0.3 mm, and was made of a material of NCF601 (Ni-based heat resistant alloy). The insulator 5 of the present example was made of MgO powder. The holder 43 of the present example had an opening with an inner diameter of ϕ4.0 mm. The glass seal 6 of the present example had an outer diameter of ϕ3.8 mm, a length of 1.5 mm and a porosity of 20 vol %, and was made of Pb-based glass (with a PbO content of 70 mass %).

When preparing the sheathed thermocouple 11 of the present example, the holder 43 was welded to the outer periphery of the base end 402 of the outer tube 4. Then, a tablet 60 for the glass seal 6 was placed in the holder 43, followed by heating the holder 43, the base end 402 of the outer tube 4 and the tablet 60 to melt the tablet 60. In this case, the glass material of the tablet 60 melted in the holder 43 flowed into the base end 402 of the outer tube 4, while spreading in the holder 43, to form a glass seal 6 containing bubbles 61.

The tablet 60 was continuously heated for 30 minutes and melted under conditions where the maximum temperature was 630° C. After that, heating was stopped to cool and solidify the tablet 60, thereby forming a glass seal 6 containing bubbles 61. Thus, bubbles 61 having a size of 1 µm to 20 µm were formed in the glass seal 6, thereby preparing a sheathed thermocouple 11.

In the present example, as in Example 1, micro cracks C were observed in the glass seal 6. As in Example 1, the sheathed thermocouple 11 of the present example was tested in terms of airtightness. As in Example 1, it was confirmed that airtightness was secured in the outer tube 4 by the glass seal 6. The rest of the present example is the same as Example 1. Furthermore, like reference signs shown in the embodiment designate like components of the embodiment 1.

(Confirmatory Test)

For the confirmatory test, four sheathed thermocouples 11 (Sample Nos. 1 to 4) having respective glass seals 6 were prepared by appropriately changing the porosity of the tablets 60, so that size range of the bubbles 61 would be different between these thermocouples. Then, the sheathed thermocouples 11 of the Sample Nos. 1 to 4 were tested in terms of airtightness. Airtightness was examined as in Example 1.

The results of examining airtightness are shown in Table 1.

TABLE 1

| Sample No. | Size of bubbles in glass seal (µm) | Airtightness |
| --- | --- | --- |
| 1 | 0 | Good |
| 2 | 1 to 10 | Good |
| 3 | 1 to 100 | Good |
| 4 | 1 to 1,000 | Poor |

As shown in the table, for Sample No. 1 no bubbles 61 were formed in the glass seal 6, or bubbles having a size of 1 µm or less were formed. In sample No. 2 bubbles 61 having a size of 1 µm to 10 µm were formed in the glass seal 6. In sample No. 3 bubbles 61 having a size of 1 µm to 100 µm were formed in the glass seal 6. In sample No. 4 bubbles 61 having a size of 1 µm to 1,000 µm were formed in the glass seal 6.

It was confirmed that airtightness was sufficiently secured in the outer tubes 4 of Sample Nos. 1 to 3. It was confirmed that reliably securing airtightness was difficult in the outer tube 4 of Sample No. 4. It is considered that airtightness was not secured in Sample No. 4 because the size of the bubbles 61 was too large to sufficiently secure the strength of the glass seal 6.

The present disclosure should not be construed as being limited to the embodiment, but different embodiments can be configured without departing from the scope of the disclosure. The present disclosure should encompass various modifications and other modifications within equivalent theory.

What is claimed is:

1. A temperature sensor comprising:
   a pair of thermocouple wires made of respective metallic materials different from each other;
   a temperature measuring junction formed by joining tip ends of the pair of thermocouple wires together;
   an outer tube made of a metallic material and having a tip end and a base end, the tip end holding the temperature measuring junction therein or having a tip end cover mounted thereto in which the temperature measuring junction is held, the base end allowing the pair of thermocouple wires to protrude therefrom;
   an insulator made of an insulating material and disposed in the outer tube to insulate the pair of thermocouple wires from the outer tube and fix the pair of thermocouple wires to the outer tube; or
   a glass seal made of a glass material and filled in at least either of the base end of the outer tube and a holder mounted to the base end of the outer tube to seal the outer tube, wherein
   the glass seal contains bubbles which are independent of each other.

2. The temperature sensor according to claim 1, wherein at least some of the bubbles has a size of 1 μm to 100 μm.

3. The temperature sensor according to claim 1, wherein the bubbles are dispersed in the entire glass seal.

4. The temperature sensor according to claim 1, wherein the glass seal has a bubble ratio, which is a ratio of the bubbles in the glass seal, in a range of 5 vol % to 30 vol %.

5. The temperature sensor according to claim 1, wherein the outer tube has an inner diameter in a range of ϕ1.5 mm to ϕ10.0 mm.

6. The temperature sensor according to claim 1, wherein a filling ratio of the insulator in the outer tube is 60 vol % or more.

7. The temperature sensor according to claim 1, wherein the glass seal is made of Bi-based glass comprising Bi or Pb-based glass comprising Pb.

8. The temperature sensor according to claim 7, wherein
the Bi-based glass has a Bi content in a range of 40 mass % to 80 mass %; and
the Pb-based glass has a Pb content in a range of 50 mass % to 80 mass %.

\* \* \* \* \*